Patented Aug. 9, 1938

2,125,981

UNITED STATES PATENT OFFICE 2,125,981

FLAKED SULPHUR DYE

George Barnhart, Woodbury, N. J., and Herbert A. Lubs, Wilmington, Del., assignors to E. I. du Pont de Nemours & Company, Wilmington, Del., a corporation of Delaware No Drawing. Application June 29, 1934, Serial No. 733,118

7 Claims. (Cl. 8—6)

A. This invention relates to the art of dyestuffs and specifically to that class of dyestuffs which are termed sulphur, or sulphide, dyes. More specifically the invention concerns a sulphide dye being a new and improved product, and a method for making the new product. This application is a continuation of our prior applications, Serial No. 431,333, filed February 25, 1930 and Serial No. 607,884, filed April 27, 1932.

B. The sulphur or, as they are sometimes called, sulphide dyestuffs are those coloring matters which are prepared by heating aromatic intermediates with sulphur or, more generally, with alkaline polysulphides. This process is called thionation and the immediate product is called the thionation mass. Generally speaking, the thionation is carried out at elevated temperatures in water or alcohol solution. At the end of the reaction the dye is introduced into water and is liberated by precipitation and filtration. The dyestuffs of this class known to the prior art are amorphous, dusty, and so difficultly soluble in water that it is usually necessary to incorporate a solubilizing agent before they can be used for dyeing. It is, consequently, required that the dyer must introduce into the dyeing bath not only the dyestuff but a solubilizing agent; scales must be kept at hand in order that the proportions of dye and solubilizing agents shall be proper; and the lightness of the dye permits it to float upon the surface of the water and to be blown about the room either by currents of air or by the simple act of pouring it into the bath.

C. It is an object of this invention to provide a sulphur dyestuff which is non-dusting, which is almost instantly water-soluble without the addition of a water-solubilizing agent, and which is of sufficient weight, even its small particles, to break the surface tension of the dye bath. It is another object of the invention to prepare this new dyestuff by a method so simple that the cost of the dye bath will not be raised. Other objects of the invention will be in part apparent and in part hereinafter set forth.

D. The objects of the invention are accomplished, generally speaking, by the product, hereinafter more fully described, of our invention, being a sulphur dyestuff substantially free of uncombined sulphur, incorporating a solubilizing agent which may also serve as a binding agent, and which is in the form of flakes or grains. The objects of our invention which relate to process are accomplished by the method which comprises, broadly speaking, removing substantially all free sulphur from a sulphur dye, slurrying the dye with a dispersing agent which preferably acts also as a binding agent, and drying the slurry in a relatively thin layer.

E. In the preferred form of the invention a thionation mass is produced by any of the satisfactory methods taught by the prior art. For instance, a phenol may be thionated by reaction with an alkali-metal polysulphide. The thionation mass, undried, is freed from uncombined sulphur, e. g., by the method disclosed in Barnhart 1,909,162, May 16, 1933; the dyestuff freed of uncombined sulphur is slurried with a substance which may serve both as a binder for the particles of the dyestuff and as a water-solubilizing agent therefor, e. g., sodium sulphide; and the slurry is dried in a thin layer.

F. It is not essential that all uncombined sulphur shall have been removed from the dyestuff in order to secure a flake product because some advantages of the invention can be obtained by the use of a sulphur dye which does contain small quantities of uncombined sulphur but, if the advantages inherent in the preferred form of the invention are to be secured in full, substantially all the uncombined sulphur should be removed.

G. Having substantially freed the thionation mass from uncombined sulphur, the mass in the preferred form of the invention, is slurried with that dispersing agent which is most commonly used for the dispersion of sulphur dyes in water baths, sodium sulphide. It is our astonishing discovery that a sulphur dyestuff substantially free of uncombined sulphur, when slurried with small quantities of sodium sulphide and dried, produces a product having a hard, lustrous appearance entirely different from anything known to the prior art.

H. To obtain the preferred form of the product, the form of comparatively small flakes or grains, the slurry of dyestuff and solubilizing-binding agent should be dried in a thin layer. An ideal method of so drying is obtained by the use of a drum drier, which picks up a thin layer of the slurry from the bath in which the drum revolves, dries the slurry to a plate-like mass, which is scraped off the drier by a doctor blade in the form of the desired flakes or grains. Other methods of drying can be used but, if used, it is advisable to dry the slurry in a comparatively thin layer. To dry in the form of blocks of comparatively large size usually involves the use of crushing machinery to reduce the block to particles of size which will dissolve quickly.

I. The following examples are given to illustrate, but not to limit, the invention:

Example I

One hundred pounds of dinitrophenol as the sodium salt in the form of a slurry in water, and heated to 90° are added gradually to a solution of sodium polysulphide containing one hundred pounds of sodium sulphide ($Na_2S$) and one hundred and ten pounds of sulphur. This will react vigorous at the start. When the reaction has subsided the charge is heated by means of steam on the jacket of the reaction kettle, and the mass evaporated to a boiling point of 110°–112°. It is held at 110°–112° for a period of six hours. The charge is then diluted with water to a volume of one hundred gallons, heated to 75° and one hundred and fifty pounds of 95% sodium sulphite added and the mixture stirred for thirty minutes. The color is precipitated by blowing with air, the color filtered off and washed in the press with fifty gallons of 10% salt solution, and blown as dry as possible. The filter cake is stirred with thirty-five gallons of water and thirty-five pounds of sodium sulphide crystals added and the mass stirred for one hour. The smooth mass thus obtained is run onto an atmospheric drum drier, heated with steam at 30–60 pounds per square inch, and rotating at from one-half to one and one-half revolutions per minute. The dried sulphur black is scraped from the drum in the form of shiny scales or platelets.

Example II

A sulphur black press cake weighing about 3000 pounds obtained by the thionation of 1365 pounds dinitrophenol with sodium polysulphide and isolated by precipitation is stirred with about 1200 pounds of water, and about 650 pounds of sodium sulphide crystals until a smooth suspension or solution is obtained. The temperature of the mass is then raised to about 55° and held there for about one-half hour. This smooth mass is then run onto a rotary atmospheric drum drier about 5 feet in diameter and 10 feet in length, heated by steam at a pressure of 30 to 60 pounds rotating with a peripheral speed of approximately 6 to 10 feet per minute. The dried sulphur black is scraped from the drier in the form of thin shiny scales or platelets.

Example III

*Sulphur Black.*—The mass obtained by the thionation of 1 part of dinitrophenol with an aqueous polysulphide containing 1 part of sodium sulphide and 1.1 parts of sulphur, was diluted with 5 parts of water, 1.5 parts of sodium sulphite added to remove the free sulphur, the whole heated to 70° C. and the dyestuff precipitated by passing air through the solution. The dye was filtered off and washed on the filter with 4 parts of 10% sodium chloride solution. The washed filter-cake was then slurried in 1 part of water, and 0.4 part of 30% sodium sulphide added and the mass stirred to a smooth suspension. It was then dried on an atmospheric drum drier heated with steam at 30–60 pounds per square inch pressure. The dried sulphur black was scraped from the revolving drum in the form of black, glistening flakes, which were directly soluble in water.

Example IV

*Sulphur Navy Blue.*—The thionation mass resulting from the fusion of 1 part of an indophenol, made by coupling orthotoluidine with para-amido-phenol, with an aqueous polysulphide containing 1.4 parts of sodium sulphide and 1.4 parts of sulphur, was diluted with 25 parts of water, and 2.5 parts of sodium sulphite added. It was then heated to 80°–85° and the dyestuff precipitated by passing air through the solution. The dyestuff was then filtered off and washed on the filter with water. It was then suspended in 1 part of water and 0.4 part of 30% sodium sulphide added and the mass stirred to a smooth colloidal suspension. The mass was then dried on an atmospheric drum drier. Glistening blue-black, water-soluble flakes were obtained.

Example V

*Sulphur Brown.*—One (1) part of meta-toluylene diamine was fused with 3 parts of sulphur for 20–24 hours at 250°–260°. The resulting thionation mass was extracted with 10 parts of 30% sodium hydroxide for about 1 hour at the boil, then diluted with 10 parts of water and the dyestuff precipitated by passing air through the solution. It was then filtered and the filter-cake mixed with 1.5 parts of 30% sodium sulphide and the mass dried on an atmospheric drum drier. Glistening, greenish-black, water-soluble flakes were obtained.

Example VI

*Sulphur Brilliant Green.*—The thionation mass obtained by the fusion of the indophenol made from 1 part of phenyl-peri-acid, and para-amidophenol, was diluted with 10 parts of water and 3 parts of sodium sulphite added. The solution was then heated to 85° and the color precipitated by passing air through the solution. The dyestuff was filtered off, suspended in 0.5 part water, and 0.25 part of 30% sodium sulphide. The viscous mass was dried on an atmospheric drum drier. Water-soluble flakes, with a metallic sheen were obtained.

Example VII

One hundred (100) pounds of dinitrophenol as the sodium salt in the form of a slurry in water, and heated to 90° were added gradually to a solution of sodium polysulphide containing 100 pounds of sodium sulphide ($Na_2S$) and 110 pounds of sulphur. This reacted vigorously at the start. When the reaction had subsided the charge was heated by means of steam on the jacket of the reaction kettle, and the mass evaporated to a boiling point of 110°–112°. It was held at 110°–112° for a period of six hours. The charge was then diluted with water to a volume of 100 gallons, heated to 75° and 150 pounds of 95% sodium sulphite added and the mixture stirred for 30 minutes. The color was precipitated by blowing with air, the color filtered off and washed in the press with 50 gallons of 10% salt solution, and blown as dry as possible. The filter cake was stirred with 35 gallons of water and 35 pounds of sodium sulphide crystals added and the mass stirred for 1 hour. The smooth mass thus obtained was run onto an atmospheric drum drier, heated with steam at 30–60 pounds per square inch, and rotating at from one-half to one and one-half revolutions per minute. The dried sulphur black was scraped from the drum in the form of shiny scales or platelets.

Example VIII

A sulphur black press cake weighing about 3000 pounds obtained by the thionation of 1365 pounds dinitrophenol with sodium polysulphide and isolated by precipitation was stirred with about 1200 pounds of water, and about 650 pounds of sodium sulphide crystals until a smooth suspension or solution was obtained. The temperature of the mass was then raised to about 55° and held there for about one-half hour. This smooth mass was then run onto a rotary atmospheric drum drier about 5 feet in diameter and 10 feet in length, heated by steam at a pressure of 30-60 pounds rotating with a peripheral speed of approximately 6-10 feet per minute. The dried sulphur black was scraped from the drier in the form of thin shiny scales or platelets.

Example IX

One (1) part by weight of the sodium salt of dinitrophenol, in the form of a 25-35% slurry, was heated to 80°-85° and run gradually into a jacketed, agitated fusion kettle containing 1.3-1.6 parts of sodium polysulphide of the ratio $Na_2S_3$, in the form of a 40% solution, and at a temperature of 90°-95°. This addition of the sodium dinitrophenolate slurry to the polysulphide was made gradually so as to avoid a too violent reaction. A temperature of 105°-108° was not exceeded during the addition. After the more vigorous stage of the reaction was over, steam was turned on the jacket and the temperature of the charge maintained at 106°-108° for two hours. At the end of the two hour period the batch was cooled to 65° and 0.09 part of hydrogen chloride added. (This step may be carried out conveniently by adding 0.33 part of 27% hydrochloric acid.) Heat was then applied to the jacket, the temperature raised to the boiling point, and the charge evaporated until a boiling point of 115°-118° was reached at which time 0.6-0.8 part of sodium thiosulphate was added. The evaporation was then continued until a temperature of 123°-126° was obtained. This temperature was maintained until the color formation was complete, as indicated by comparison of the shade of the product with a standard batch. (The porous paper spot test may be used if desired.) The charge was then diluted with 1 part of water, cooled to 80° and 0.15-0.30 part of sodium sulphite added. Afterwards the color was precipitated with sodium bisulphite, filtered, and washed on the filter with 4 parts of 10% sodium chloride solution. The filter cake was then slurried with 1 part of water and 0.4 part of sodium sulphide crystals added and stirred into solution. The viscous liquid thus obtained was then dried in pans or on a rotary drum drier. The dried product was in the form of shining vitreous-appearing particles.

J. The dyestuff produced by this process, whether in the form of flakes, grains, or blocks, is immediately soluble in water without the addition of solubilizing agents; it is non-dusting and stable, retaining its full efficacy for many years. The dyestuff of the preferred form of the invention does not contain appreciable amounts of free sulphur and may, consequently, be used to dye delicate materials without danger of producing sulphur spots. When added to a dye bath practically all the particles immediately sink into it, which constitutes a considerable advantage over the older form of dyestuff, a large portion of whose particles floated on the surface until mechanically incorporated in the bath by stirring.

K. The sulphur blacks, which form a major portion of our invention and which are sufficiently improved as to constitute an additional invention, are characterized by unusual stability, great strength, ready dispersibility, non-dusting tendency, and by a glistening metallic sheen, and when poured into water instantly form a greenish true or colloidal solution. On application to the fiber these colors have less tendency to produce bronziness than the old sulphur blacks. This is especially true when applied to the fiber from a standing bath.

L. The particles are dust-free and in that way possess great advantage over sulphur dyes of the prior art and improve the working conditions in dye houses. Other advantages of the invention will be apparent to persons skilled in the art.

M. A variety of methods of preparing sulphur dyes have been indicated in the examples forming a part of this application; these various processes do not limit the invention but indicate the applicability of our invention to all types of sulphur dyes.

N. For the dispersing-binding agents which have been disclosed hereinbefore potassium sulphide may be substituted without diminution of efficiency.

O. As many apparently widely different embodiments of this invention may be made without departing from the spirit and scope thereof, it is to be understood that we do not limit ourselves to the specific embodiments thereof except as defined in the appended claims.

We claim:

1. A composition of matter, having the physical form of hard, shiny flakes or grains, comprising sodium sulphide, and a sulphur dye free from uncombined sulphur.

2. A composition of matter, having the physical form of hard, shiny flakes or grains, comprising sodium sulphide, and a sulphur dye substantially free from uncombined sulphur.

3. A composition of matter, having the physical form of hard, shiny flakes or grains, comprising an alkali metal sulphide, and a sulphur dye substantially free from uncombined sulphur.

4. A composition of matter, having the physical form of hard, shiny flakes or grains, comprising a water-solubilizing binder, and a sulphur dye substantially free from uncombined sulphur.

5. A composition of matter, having the physical form of hard, shiny flakes or grains, comprising a dispersing agent for a sulphur dye, and a sulphur dye substantially free from uncombined sulphur.

6. The method of making a sulphur dye in the form of water-soluble flakes or grains which comprises making a sulphur dye, removing substantially all free sulphur therefrom, slurrying the sulphur dye with sodium sulphide, drying in a thin layer on a drum drier, and removing the composition from the drier in the form of flakes or grains by scraping the drum with a blade.

7. The method of making a sulphur dye in the form of water-soluble flakes or grains which comprises removing from a sulphur dye substantially all free sulphur, slurrying the dye with sodium sulphide, and drying the composition in a thin layer on a drum drier.

GEORGE BARNHART.
HERBERT A. LUBS.